Figure 1:
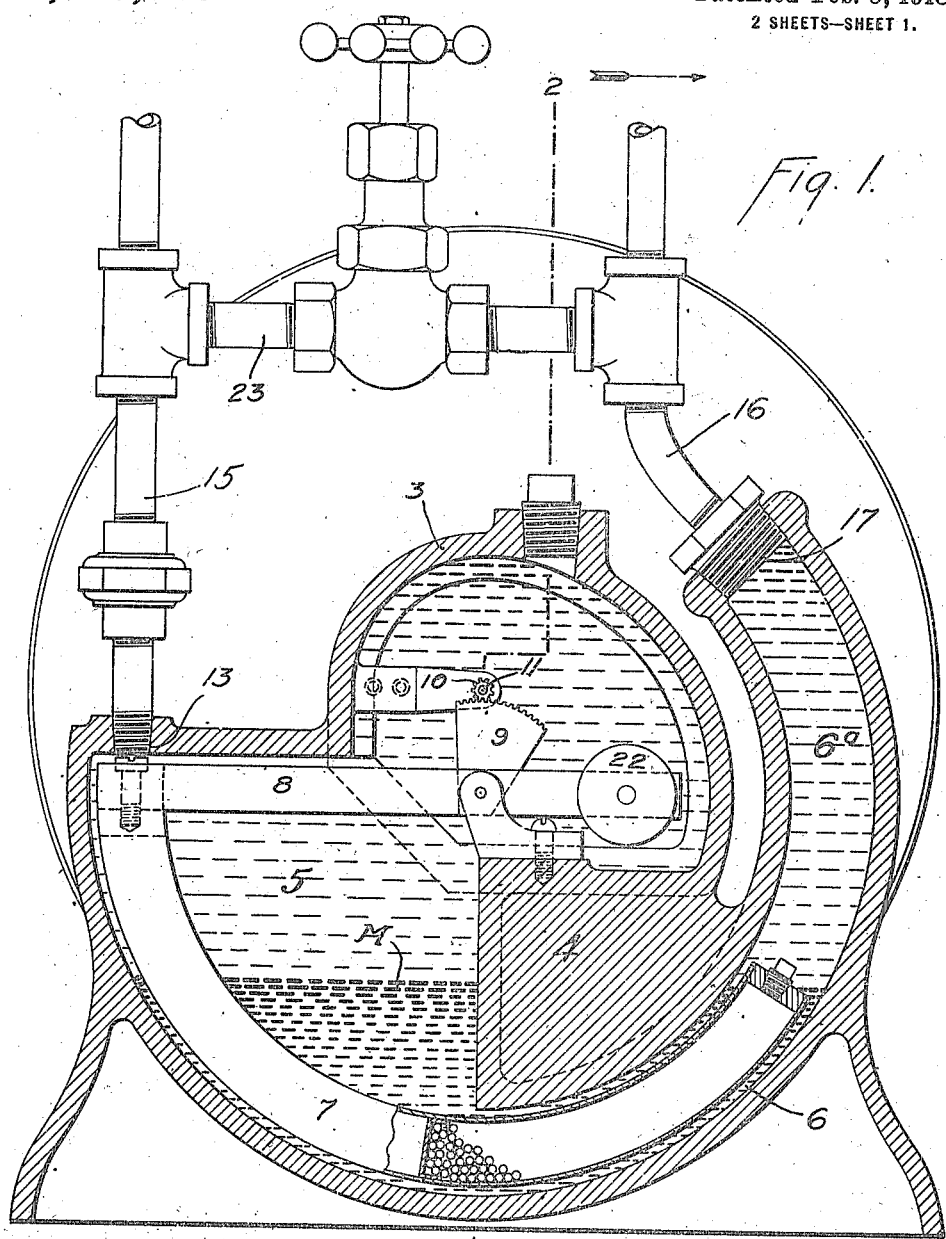

E. F. FISHER.
FLUID FLOW INDICATING METER.
APPLICATION FILED JUNE 24, 1914.

1,255,523.

Patented Feb. 5, 1918.
2 SHEETS—SHEET 1.

WITNESSES:

INVENTOR.
Ernest F. Fisher

BY

HIS ATTORNEY IN FACT

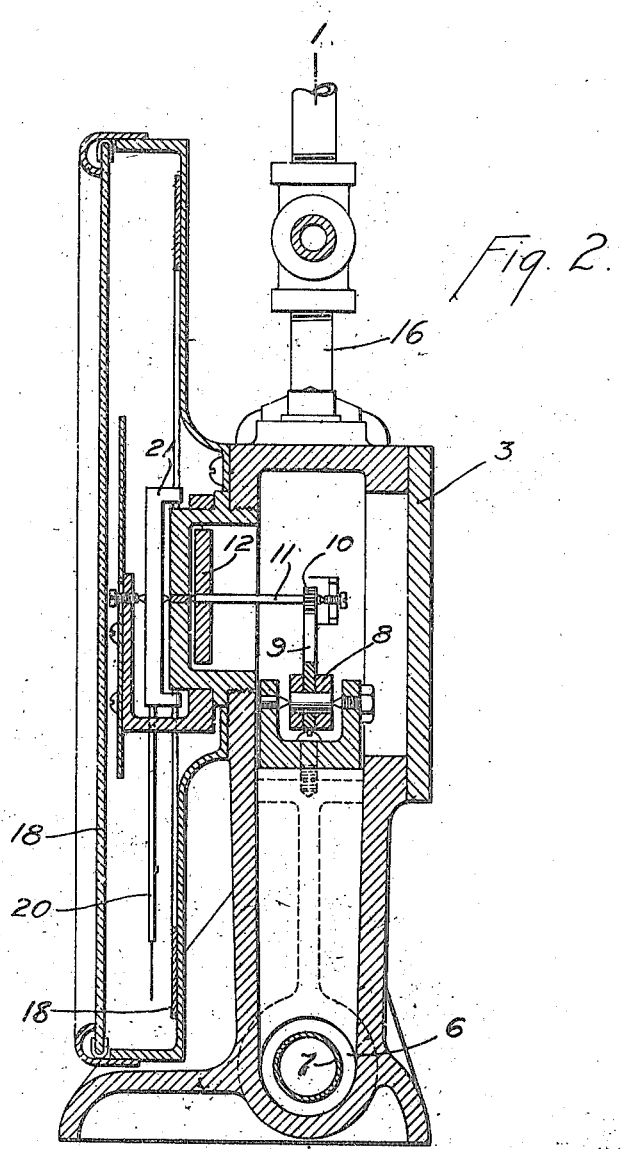

UNITED STATES PATENT OFFICE.

ERNEST F. FISHER, OF PITTSBURGH, PENNSYLVANIA, ASSIGNOR TO GENERAL ELECTRIC COMPANY, A CORPORATION OF NEW YORK.

FLUID-FLOW-INDICATING METER.

1,255,523.  Specification of Letters Patent.  Patented Feb. 5, 1918.

Application filed June 24, 1914. Serial No. 847,035.

*To all whom it may concern:*

Be it known that I, ERNEST F. FISHER, a citizen of the United States, and a resident of Pittsburgh, in the county of Allegheny and State of Pennsylvania, have made a new and useful Invention in Fluid-Flow-Indicating Meters, of which the following is a specification.

This invention relates to fluid flow meters and has for an object to produce an indicating meter of simple and improved construction, employing means for accurately indicating variations in the flow of fluid through a pipe or passage with which it communicates.

Broadly considered the meter illustrated consists of a movable piston, which is adapted to be subjected on opposite ends to the pressures set up by a suitable pressure difference creating device, which device creates a pressure difference that bears a definite relation to the rate of flow. This may be the pressure difference between the static and impact pressures of a moving fluid, the velocity of which is to be measured. These are commonly referred to as the leading and trailing pressures. The piston is capable of moving to different positions in response to variations in the preponderance of one pressure over the other and is therefore capable of actuating an indicating mechanism and of indicating the variations in velocity of the fluid. By static pressure I mean the pressure of the fluid in the pipe or passage with which the meter communicates, and by impact pressure I mean that pressure occasioned by the impact of the fluid traversing the pipe or passage against a stationary object located in the passage; or, in other words, that pressure occasioned by the impact of the moving particles or molecules of the fluid when they are brought suddenly to rest by colliding with a stationary object.

In the drawings accompanying and forming a part of this application, Figure 1 is a vertical sectional view of the meter along the line 1—1 of Fig. 2, and Fig. 2 is a vertical sectional view along the line 2—2 of Fig. 1 and looking in the direction of the arrows.

The apparatus illustrated includes a hermetically sealed casing 3, which is divided by an internal wall 4 into a chamber 5 and a chamber 6. The wall 4 does not extend to the bottom of the casing 3, but communication is cut off between the chambers 5 and 6 by means of a substantially frictionless packing such as a liquid seal through which a piston 7 projects from the chamber 5 into the chamber 6. Any suitable liquid may be employed for segregating the chambers, but I have found that a heavy liquid, such for example as mercury M, is desirable. I have also found that, under operating conditions, it is desirable to entirely fill the casing 3 above the level of the mercury with a lighter liquid, such for example as water. It will, however, be understood that, under certain conditions, the water may be replaced by any other fluid, or in fact, by air, and that various liquids or even gases may be employed as the sealing agent between the chambers 5 and 6.

As illustrated, the piston 7 is arc shaped and is provided with a substantially radially-extending arm 8, which is pivotally mounted at a point near the center of curvature of the arc shaped piston. It is essential to provide a smooth outer surface for the piston, and it is desirable, although not necessary, to reduce the peripheral surface of the piston to a minimum; for this reason I have shown a piston circular in cross section. It is also desirable to weight the piston at one end, so that it will normally swing to a position in which the arm 8 is mounted substantially horizontal. The weighting of the piston is also advisable for the reason that the piston can thereby be made to more accurately approximate a desired weight without the necessity of varying its exterior contour. I also find it advisable to use a hollow piston and to weight it at the end farthest from the arm 8 for the reasons just enumerated, and so that the center of mass will be located substantially under the pivot point.

The casing 3 conforms to the shape and path of travel of the moving parts, namely, the piston and its mounting arm, and as illustrated, is a semi-cylindrical casing, in which the chamber 6 is arc shaped and provided with an arc shaped extension 6[a], conforming to the shape and path of travel of the piston 7.

The arm 8 is pivoted on a transversely extending trunnion, or one which extends at right angles to the plane of motion of the piston. The arm 8 is shown as provided with a sector shaped pinion 9, which meshes with a second pinion 10 mounted on a suitable trunnion or shaft 11 which, as shown in Fig. 2, is suitably journaled on the casing 3. This element 10 is employed for transmitting the motion of the piston 7 to an indicating mechanism, as will hereinafter be described. The chamber 5 is provided with a port 13, and through the port and a passage 15, is adapted to communicate with an impact pressure chamber of any well known device, such as a Pitot tube. The chamber 6 is adapted to communicate with the static pressure chamber of such device through a passage 16 and a port 17. Under ordinary operating conditions, the pressure in the chamber 5 will exceed that in the chamber 6, and consequently the piston 7 will be caused to move into the chamber 6 an amount corresponding to the preponderance of the pressure within the chamber 5 over that of the chamber 6. It will be understood that the weight of the piston 7 normally tends to return it to the normal position and that as the motion of the piston continues in response to the unbalanced pressure, the center of mass of the piston will be elevated and moved farther away from the vertical plane passing through the pivot point of the piston, and that consequently the piston will assume a definite and certain position for each increment of pressure in the chamber 5 above that in the chamber 6.

In ascertaining the velocity of the fluid I employ the following equation:

$$v_1 = \sqrt{2gh} \times \frac{M+m}{m}$$

in which $v_1$ is the velocity of the fluid to be measured; $g$ the acceleration due to gravity; $h$ the height to which the center of mass of the piston is elevated; M the quotient of the mass of the piston divided by the effective piston area and $m$ the density of the fluid. In practice the quantity $m$ is the difference between the pressure existing in the chamber 5 and the pressure existing in the chamber 6.

Any suitable indicating apparatus may be employed for indicating the motion of the piston or the velocity of flow of the fluid traversing the pipe or passage with which the meter communicates. In the drawings, 18 indicates a dial preferably circular in shape, and graduated in accordance with the above noted equation, so that the velocity of the fluid can be read without being first computed. The motion of the piston 7 is transmitted to an indicating arm 20 by means of the pinion 10, the shaft 11, a permanent magnet 12 located within the casing 3 and a second permanent magnet 21 pivotally mounted outside of the casing and on which the hand 20 is mounted. By making the casing 3 of brass or other non-magnetic material, the magnet 21 will follow the movements of the magnet 12 and, consequently, will move the arm 20 to different positions around the dial corresponding to different positions of the piston 7. In this way the meter will indicate the velocity of flow of the fluid passing through the pipe or passage with which it connects.

In the apparatus illustrated, I have shown the arm 8 extending beyond its pivotal point and provided with a counter-balancing weight 22, which is capable of being adjusted longitudinally of the arm for the purpose of varying the position of the center of gravity of the pivotally mounted piston and its arm, and of thereby adjusting the meter for different fluid velocities, so that it can be employed in indicating velocities through a wide range.

In Fig. 1, I have also shown a valved equalizing passage 23 between the passages 15 and 16 which, when the valve is open, equalizes the pressures in the chambers 5 and 6 and consequently returns the piston 7 to its normal position.

While I have, in accordance with the patent statutes, illustrated and described what I consider to be the preferred embodiment of my invention, it will be understood that various changes, substitutions, modifications, additions and omissions may be made in the apparatus without departing from the spirit and scope of my invention, as set forth by the appended claims.

Having thus described my invention, what I claim is:

1. In a fluid velocity meter, a casing including two pressure chambers, a liquid seal between said chambers, an arc shaped piston pivotally mounted in the casing and extending through said seal, and adjustable means for varying the position of the center of gravity of the piston.

2. In a fluid flow meter, a casing having two separate chambers formed therein, a liquid seal between the chambers, a piston extending from one chamber through the seal into the other chamber, and adjustable means for varying the operation of the piston.

3. A fluid velocity meter comprising two pressure chambers, a pivotally mounted piston, exposed at one end to the pressure in one pressure chamber and at the other end to the pressure in the second pressure chamber, a liquid seal between said chambers, an indicating mechanism, a shaft geared to said piston and a magnetic connection between said shaft and said indicating mechanism.

4. In a fluid velocity meter, a hermetically sealed casing comprising two pressure chambers, an arc-shaped piston pivotally mounted in the casing and extending from one pressure chamber to the other pressure chamber, a permanent magnet located within the casing and actuated by said piston, an indicating mechanism exterior of the casing, and a magnet located exterior of the casing and controlled by said first magnet for actuating said indicating mechanism.

5. In a fluid velocity meter, a casing having two pressure chambers formed therein, a liquid seal between said chambers, an arc shaped piston pivotally mounted within the casing and extending through said seal, and adjustable means for varying the reactive force of the piston.

6. A fluid metering device, comprising a pivotally mounted piston having opposing piston surfaces, means for subjecting said surfaces to different pressures, a fluid seal separating the one piston surface from the other, and means for indicating movements of said piston.

7. In a fluid velocity meter, a casing having two pressure chambers, a piston extending from one pressure chamber to the other pressure chamber, and a liquid seal between said chambers and surrounding said piston.

8. In a fluid velocity meter, a casing having two pressure chambers, a pivotally mounted piston exposed at one end to the pressure in one pressure chamber and at the other end to the pressure in the other pressure chamber, and a liquid seal between said chambers and surrounding an intermediate portion of said piston.

9. In a fluid velocity meter, a casing having two pressure chambers, an arc-shape piston suspended in the casing and exposed at one end to the pressure in one chamber of the casing and at the other end to the pressure in the other chamber of the casing, and means actuated by the piston for indicating variations in its positions.

10. In a fluid velocity meter, a casing having two pressure chambers, an arc-shape piston pivoted within the casing and extending from one pressure chamber to the second pressure chamber, a liquid seal between said chambers and means actuated by the piston for indicating different positions of the piston.

11. In an apparatus of the character described, the combination of means forming two communicating chambers, a pivotally mounted piston extending from one chamber to the other, a fluid seal between said chambers, and means forming conduits for conveying a leading and a trailing pressure to said chambers.

In testimony whereof, I have hereunto subscribed my name this 20th day of June, 1914.

ERNEST F. FISHER.

Witnesses:
C. W. McGHEE,
E. W. McCALLISTER.